(12) United States Patent
Ryu et al.

(10) Patent No.: US 10,037,381 B2
(45) Date of Patent: Jul. 31, 2018

(54) APPARATUS AND METHOD FOR SEARCHING INFORMATION BASED ON WIKIPEDIA'S CONTENTS

(71) Applicant: Electronics and Telecommunications Research Institute, Daejeon (KR)

(72) Inventors: Pum-Mo Ryu, Daejeon (KR); Hyun-Ki Kim, Daejeon (KR); Sang-Kyu Park, Daejeon (KR); Yong-Jin Bae, Daejeon (KR); Jeong Heo, Daejeon (KR); Hyo-Jung Oh, Daejeon (KR); Chung-Hee Lee, Daejeon (KR); Soo-Jong Lim, Daejeon (KR); Myung-Gil Jang, Daejeon (KR); Mi-Ran Choi, Daejeon (KR); Yoon-Jae Choi, Daejeon (KR); Yeo-Chan Yoon, Daejeon (KR); Yo-Han Jo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 477 days.

(21) Appl. No.: 14/260,828

(22) Filed: Apr. 24, 2014

(65) Prior Publication Data
US 2015/0193505 A1 Jul. 9, 2015

(30) Foreign Application Priority Data
Jan. 7, 2014 (KR) .................. 10-2014-0002033

(51) Int. Cl.
G06F 17/30 (2006.01)
(52) U.S. Cl.
CPC .. *G06F 17/30864* (2013.01); *G06F 17/30657* (2013.01)

(58) Field of Classification Search
None
See application file for complete search history.

(56) References Cited

U.S. PATENT DOCUMENTS 8,583,422 B2 11/2013 Todhunter et al.
2009/0204605 A1* 8/2009 Bai .................. G06F 17/30654
(Continued)

FOREIGN PATENT DOCUMENTS

KR 2011-0026039 A 3/2011
KR 10-2012-0042562 A 5/2012
(Continued)

OTHER PUBLICATIONS

Gjergji Kasneci et al., "The YAGO-NAGA Approach to Knowledge Discovery" ACM SIGMOD Record, vol. 37, Issue 4, pp. 41-47, Dec. 2008.
(Continued)

*Primary Examiner* — Amresh Singh
(74) *Attorney, Agent, or Firm* — Rabin & Berdo, P.C.

(57) ABSTRACT

The present invention is to provide an apparatus for searching information based on Wikipedia's contents comprising: a document converting part extracting fulltext documents, section title documents, info-box documents, category documents and definition statement documents from Wikipedia original documents and generating at least one of Wikipedia documents for questions and answers; a document indexing part analyzing the Wikipedia document for questions and answers, extracting POS-based index terms from the Wikipedia document for questions and answers, and generating a Wikipedia document index for questions and answers; a question analyzing part receiving a natural language question, analyzing a question pattern, an answer pattern and a question focus from the natural language question, and extracting document search keywords; a document searching part performing document search by using the document (Continued)

search keywords from the Wikipedia document index for questions and answers and generating document search result from each Wikipedia document index for questions and answers; an answer extracting part extracting first answers by using information about the question pattern, the answer pattern and the question focus from the document search result; and an answer integrating part integrating and prioritizing the first answer and generating a second answer.

12 Claims, 9 Drawing Sheets

(56) References Cited

U.S. PATENT DOCUMENTS

| | | | |
|---|---|---|---|
| 2012/0101807 A1 | 4/2012 | Heo et al. | |
| 2013/0007055 A1* | 1/2013 | Brown | G06F 17/30654 |
| | | | 707/769 |
| 2013/0080184 A1* | 3/2013 | Streat | G06Q 50/24 |
| | | | 705/2 |

FOREIGN PATENT DOCUMENTS

| | | |
|---|---|---|
| KR | 10-2012-0061133 A | 6/2012 |
| KR | 2012-0064559 A | 6/2012 |
| KR | 10-2012-0108331 A | 10/2012 |

OTHER PUBLICATIONS

Johannes Hoffart et al., "YAGO2: A Spatially and Temporally Enhanced Knowledge Base from Wikipedia" Artificial Intelligence Journal, vol. 194, pp. 28-61, Mar. 19, 2012.

Christian Bizer et al., "DBpedia—A Crystallization Point for the Web of Data" Web Semantics: Science, Services and Agents on the World Wide Web, vol. 7, Issue 3, pp. 154-165, May 25, 2009.

David Ferrucci et al., "Building Watson: An Overview of the DeepQA Project" AI Magazine, vol. 31, Issue 3, pp. 59-79, Fall 2010.

* cited by examiner

```
<DOCID>A1234801
<TITLE>Eiffel Tower
<DOCTYPE>PAGE_CONTENT
<DESCRIPTION>
Eiffel Tower is a tower located on Champ de Mars in Paris
and was built in 1889. The Tower which is a landmark in
France is an iron lattice tower.
Eiffel Tower is the tallest structure in Paris and a tourist
attraction where millions people visit every year.
Eiffel Tower was named from the designer name of Gustave
Eiffel and built as the entrance arch to the 1889 World's Fair
for the 100$^{th}$ anniversary of the French Revolution.
```

0312

```
<DOCID>A1234802
<TITLE>Eiffel Tower  Design of the Tower  Materials
<DOCTYPE>PAGE_CONTENT
<DESCRIPTION>
The cast iron structure of the Eiffel Tower weights 7,300 tons,
while the entire structure including non-metallic components
is 10,000 tons.
If the 7,300 tons of the metal is melted, it is filled on
125 square meters to a depth of only 6 cm, assuming that
the density of metal to 7.8 tons per cubic meter.
The height of the Tower can be reduced by approximately 18 cm
from the top due to thermal expansion(shrinkage) of the metal.
```

Fig. 4

```
                                                                    0321
<DOCID>A12348
<TITLE>Eiffel Tower   Design of the Tower   Materials
<DOCTYPE>SECTION TITLE
<SECTION_CONTENT_DOCID>A1234802
<DESCRIPTION>
Eiffel Tower    Design of the Tower    Materials
```

Fig. 5

```
<DOCID>A12348
<TITLE>Eiffel Tower
<DOCTYPE>INFOBOX
<DESCRIPTION>
Eiffel Tower    Building Name                      Eiffel Tower
Eiffel Tower    Building Name in the               Tower Eiffel
                original language
Eiffel Tower    Location                           Paris
Eiffel Tower    Status                             Completion
Eiffel Tower    Ground-breaking Ceremony           1887
Eiffel Tower    Completion                         1889
Eiffel Tower    Construction period                1887-1889
Eiffel Tower    Purpose                            Observation, Radio and
                                                   TV Broadcasting, Turism
Eiffel Tower    Antenna_Steeple Height             324 m
Eiffel Tower    Roof Height                        300.65 m
Eiffel Tower    Architect                          Gustave Eiffel
Eiffel Tower    Engineer                           Gustave Eiffel
```

Fig. 6

```
<DOCID>A12348
<TITLE>Eiffel Tower
<DOCTYPE>CATEGORY
<DESCRIPTION>
[Eiffel Tower] Tower in France Monument the skyscraper in France Structure in Paris Symbol in Paris
```
D341

Fig. 7

```
<DOCID>A1234802
<TITLE>Eiffel Tower
<DOCTYPE>DEFINITION
<DESCRIPTION>
Eiffel Tower is a tower located on Champ de Mars in Paris and
was built in 1889. The Tower which is a landmark in France is
an iron lattice tower. Eiffel Tower is the tallest structure
in Paris and a tourist attraction where millions people visit
every year. Eiffel Tower was named from the designer name of
Gustave Eiffel and built as the entrance arch to the 1889 World's
Fair for the 100$^{th}$ anniversary of the French Revolution.
```

D351

US 10,037,381 B2

APPARATUS AND METHOD FOR SEARCHING INFORMATION BASED ON WIKIPEDIA'S CONTENTS

CROSS REFERENCE TO RELATED APPLICATION

This application claims the benefit of Korean Patent Application No. 10-2014-0002033, filed on Jan. 7, 2014, entitled "Apparatus and Method for searching information based on Wikipedia's contents", which is hereby incorporated by reference in its entirety into this application.

BACKGROUND OF THE INVENTION

1. Technology Field

The present invention relates to an apparatus and method for searching information based on WIKIPEDIA®'s contents (hereinafter, "Wikipedia" is used as a short form for "WIKIPEDIA®").

2. Description of the Related Art

Wikipedia is collaboratively edited on-line encyclopedia and Wikipedia-based high quality contents are rapidly globally growing. Information extracted from the Wikipedia is utilized in a variety of applications of knowledge services. YAGO (Yet Another Great Ontology) is a huge knowledge base standardized based on entity information of the Wikipedia, category information of entities, and info-box information of entities. DBPedia is a knowledge base standardized based on info-box information included in each entity of the Wikipedia. A NAGA system is a question and answering service which provides an answer by extracting answers to a user's natural language question from the YAGO knowledge base. A WATSON question answering system provides an answer to a user's natural language question by analyzing not only Wikipedia but also numerous texts. The WATSON question answering system extracts an answer from fulltexts of the Wikipedia but structured or semi-structured information uses constraint information to extract an answer. The relating patent "Providing answers to questions using multiple models to score candidate answers (US 20130007055 A1)" only teaches use of Wikipedia semi-structured information to generate candidate answers but does not teach detailed methods.

Problems of the Wikipedia-based question answering system can be divided into two kinds.

First, when Wikipedia contents are converted to a knowledge base, ambiguity and information losses are caused. Even though Wikipedia's semi-structured information (entity information, category information, info-box information, document structure) can be converted relatively easily to structured knowledge, ambiguity problems may be caused when natural language expressions are mapped to standardized classes, properties, instances of the knowledge base in the processes of standardizing Wikipedia fulltexts and converting them to structured knowledge, resulting in distortions and losses of information. The knowledge base-based question answering system standardized based on Wikipedia can, thus, only use a part of information from the Wikipedia.

Second, since names such as classes, properties, instances and the like are standardized and stored in the knowledge base standardized based on the Wikipedia contents, ambiguity of knowledge can be reduced. However, the natural language question and answering service using them can extract answers from the knowledge base when words in the natural language question should be converted precisely to class names, property names, and instance names of the knowledge base. The process for converting natural language expressions to standardized knowledge base expressions has another ambiguity which deteriorates performance of the question answering system.

Prior Art: KR Patent Publication No. 1020110026039

SUMMARY OF THE INVENTION

An object of the present invention is to provide an apparatus and method for searching information based on Wikipedia's contents which allows text searches not only for unstructured information of Wikipedia but also for structured information to reduce costs and information losses associated with building the knowledge base.

Another object of the present invention is to provide an apparatus and method for searching information based on Wikipedia's contents which is able to extract exact answers by reflecting features of Wikipedia structured information to the entire steps (text document converting step, indexing step, document searching step, answer extracting step) of a question answering system.

Still another object of the present invention is to provide an apparatus and method for searching information based on Wikipedia's contents which is able to establish a question answering system through the same method for a variety of resources including various types of structured information and unstructured information as well as Wikipedia.

According to an embodiment of the present invention, there is provided an apparatus for searching information based on Wikipedia's contents comprising: a document converting part extracting fulltext documents, section title documents, info-box documents, category documents and definition statement documents from Wikipedia original documents and generating at least one of Wikipedia documents for questions and answers; a document indexing part analyzing the Wikipedia documents for questions and answers, extracting POS-based (Part-of-Speech-based) index terms from the Wikipedia documents for questions and answers, and generating a Wikipedia document index for questions and answers; a question analyzing part receiving a natural language question, analyzing a question pattern, an answer pattern and a question focus from the natural language question, and extracting document search keywords; a document searching part performing document search by using the document search keywords from the Wikipedia document index for questions and answers and generating document search result from each Wikipedia document index for questions and answers; an answer extracting part extracting first answers by using information about the question pattern, the answer pattern and the question focus from the document search results; and an answer integrating part integrating and prioritizing the first answers and generating a second answer.

In an embodiment of the present invention, the Wikipedia document index for questions and answers may comprise at least one chosen from a fulltext document index, a section title document index, an info-box document index, a category document index and a definition statement document index.

In another embodiment of the present invention, the question pattern may be one chosen from a short-answer type question, a display type question and a descriptive type question, the answer pattern may be one chosen from answers for people, organizations and locations, and the question focus may be one chosen from an entity of interest, an entity property and an entity ID.

In still another embodiment of the present invention, the document searching part may comprise: a fulltext document searching part generating document search result by performing fulltext document index search from the Wikipedia document index for questions and answers using the document search keywords; a section title document searching part generating document search result by performing section title document index search from the Wikipedia document index for questions and answers using the document search keywords; an info-box document searching part generating document search result by performing info-box document index search from the Wikipedia document index for questions and answers using the document search keywords; a category document searching part generating document search result by performing category document index search from the Wikipedia document index for questions and answers using the document search keywords; and a definition statement document searching part generating document search result by performing definition statement document index search from the Wikipedia document index for questions and answers using the document search keywords.

In still another embodiment of the present invention, the answer extracting part may comprise: a fulltext-based answer extracting part receiving the document search result from the fulltext document searching part of the document searching part and extracting first answers from the document searched based on the answer pattern and the question focus; a section title-based answer extracting part receiving the document search result from the section title document searching part of the document searching part, wherein the document search result includes section contents document, and providing the section contents document as a first answer; an info-box-based answer extracting part receiving the document search result from the info-box document searching part of the document searching part and extracting an property value as a first answer by matching the natural language question with entity or property ID of the info-box document; a category-based answer extracting part receiving the document search result from the category document searching part of the document searching part and extracting a title of a corresponding page as a first answer by matching the natural language question with a category list to which the page belongs; and a definition statement-based answer extracting part receiving the document search result from the definition statement document searching part of the document searching part and providing definition statement of the Wikipedia page as a first answer by matching the question focus with the Wikipedia page title.

In still another embodiment of the present invention, the answer integrating part may receive a plurality of the first answers from the answer extracting part, integrate the same answers from the plurality of the first answers, and generate the second answer by providing the priority to the same answers.

According to another embodiment of the present invention, there is provided a method for searching information based on Wikipedia's contents comprising: generating at least one of Wikipedia documents for questions and answers by extracting fulltext documents, section title documents, info-box documents, category documents and definition statement documents from Wikipedia original document; generating a Wikipedia document index for questions and answers by analyzing the Wikipedia document for questions and answers and extracting POS-based index terms from the Wikipedia document for questions and answers; extracting document search keywords by receiving a natural language question and analyzing a question pattern, an answer pattern and a question focus from the natural language question; generating document search result from each Wikipedia document index for questions and answers by performing document search using the document search keywords from the Wikipedia document index for questions and answers; extracting first answers by using information about the question pattern, the answer pattern and the question focus from the document search results; and generating a second answer by integrating and prioritizing the first answers.

The apparatus and method for searching information based on Wikipedia's contents according to an embodiment of the present invention allows text searches not only for unstructured information of Wikipedia but also for structured information to reduce costs associated with building knowledge base and information losses.

The apparatus and method for searching information based on Wikipedia's contents according to another embodiment of the present invention is able to extract exact answers by reflecting features of Wikipedia structured information to the entire steps (text document converting step, indexing step, document searching step, answer extracting step) of a question answering system.

The apparatus and method for searching information based on Wikipedia's contents according to still another embodiment of the present invention is able to establish a question answering system through the same method for a variety of resources including various types of structured information and unstructured information as well as Wikipedia so that the area of a question answering system can be easily expanded.

BRIEF DESCRIPTION OF THE DRAWINGS

FIG. 3 illustrates a section title document according to an embodiment of the present invention.

FIG. 4 illustrates a section title document according to an embodiment of the present invention.

FIG. 5 illustrates an info-box document according to an embodiment of the present invention.

FIG. 6 illustrates a category document according to an embodiment of the present invention.

FIG. 7 illustrates a definition statement document according to an embodiment of the present invention.

DESCRIPTION OF THE EXEMPLARY EMBODIMENTS

Objects and effects and technical constitutions to achieve them will become clear when referred to certain embodiments of the present invention which will be hereinafter described in detail with reference to the accompanying drawings. Throughout the description of the present invention, when describing a certain technology is determined to evade the point of the present invention, the pertinent detailed description will be omitted. The terms used in the description are terms which are defined in consideration of functions in the present invention and may vary with users' or operators' intention or practice.

However, it is to be appreciated that the present invention may not be limited to particular embodiments of the present invention which will be described below but various changes and modifications may be made by those skilled in the art. The exemplary embodiments of the present invention are provided to complete the disclosure of the present invention and fully inform the scope of the present invention to those who are skilled in the art. The present invention should be defined by the scope of the following claims and the definitions should be interpreted based on the entire description of the present invention.

The present invention may provide a method for extracting an answer comprising converting Wikipedia to a standardized knowledge base, converting structured and unstructured information of Wikipedia to text documents for text document search to resolve mapping problems between natural language questions and knowledge base configuration elements which are caused during questioning and answering, searching any relating document by using keywords included in a user's question and extracting an answer by using features of each document from the searched documents.

The present invention will be described below in more detail with reference to the accompanying drawings.

Figure 1:
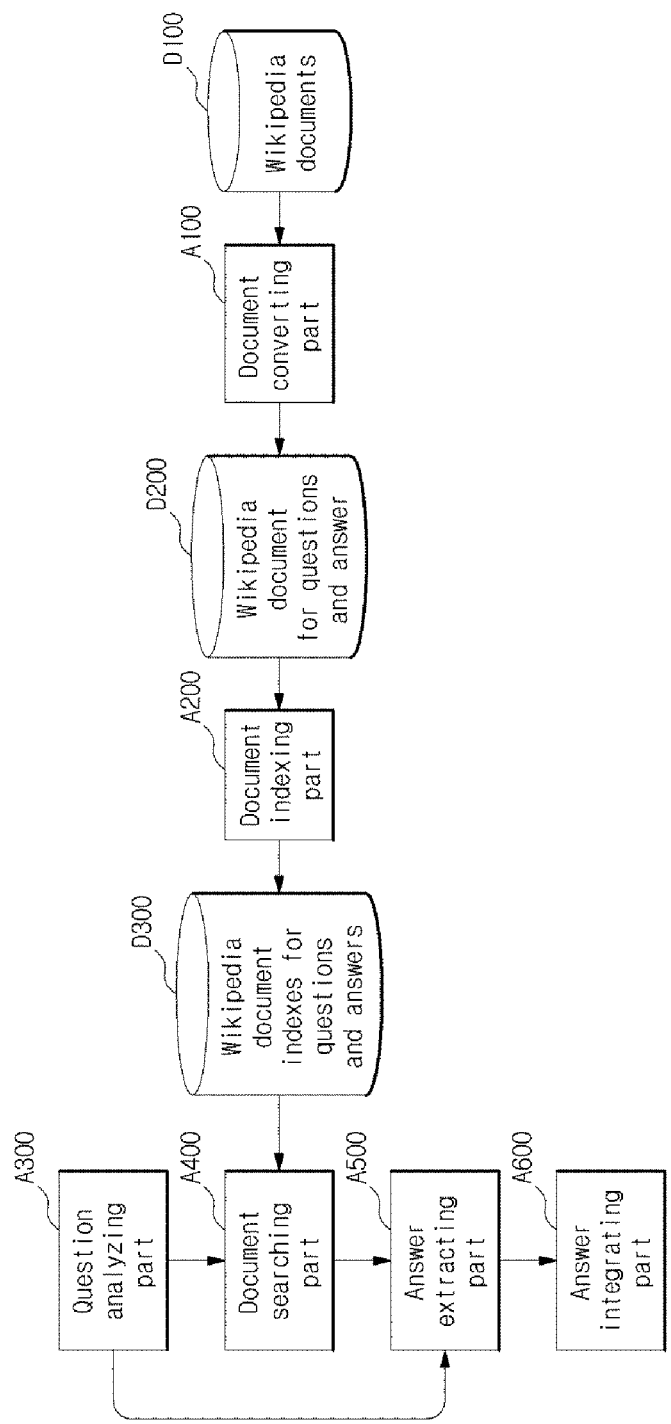
FIG. 1 illustrates an apparatus for searching information based on Wikipedia's contents according to an embodiment of the present invention.

FIG. 1 illustrates an apparatus for searching information based on Wikipedia's contents according to an embodiment of the present invention.

Referring to FIG. 1, an apparatus for searching information based on Wikipedia's contents according to an embodiment of the present invention may include a document converting part A100, a document indexing part A200, a question analyzing part A300, a document searching part A400, an answer extracting part A500 and an answer integrating part A600.

Figure 2:
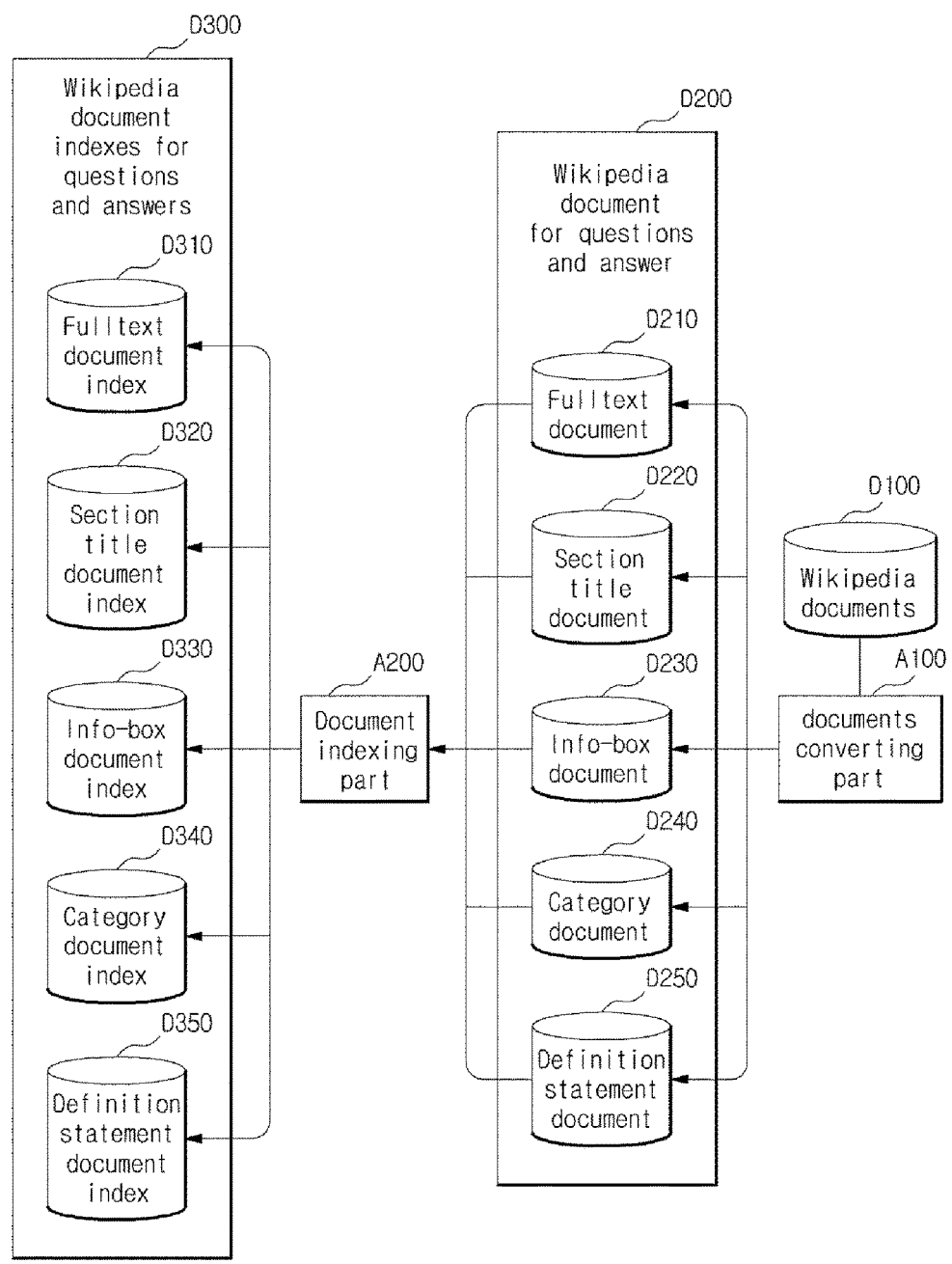
FIG. 2 illustrates an internal configuration of an apparatus for searching information based on Wikipedia's contents according to an embodiment of the present invention.

The document converting part A100 may generate Wikipedia document for questions and answers D200 from Wikipedia original document D100. Referring to FIG. 2, the Wikipedia document for questions and answers D200 may include a fulltext document D210, a section title document D220, an info-box document D230, a category document D240 and a definition statement document D250. The Wikipedia document for questions and answers D220 may be one or more. In an embodiment of the present invention, the document converting part A100 may extract the fulltext document D210, the section title document D220, the info-box document D230, the category document D240 and the definition statement document D250 from the Wikipedia original documents D100 and generate at least one of Wikipedia documents for questions and answers D200 from the extracted documents.

The document indexing part A200 may receive the Wikipedia document for questions and answers D200 from the document converting part A100. The document indexing part A200 may analyze the Wikipedia document for questions and answers D200, extract POS-based index terms from the Wikipedia document for questions and answers D200, and generate Wikipedia document indexes for questions and answers D300.

Referring to FIG. 2, the Wikipedia document index for questions and answers D300 may include at least one selected from a fulltext document index D310, a section title document index D320, an info-box document index D330, a category document index D340 and a definition statement document index D350.

FIG. 3 illustrates a section title document according to an embodiment of the present invention.

Referring to FIG. 3, the document converting part A100 according to an embodiment of the present invention may generate a plurality of fulltext documents D210 by dividing one of the Wikipedia original documents D100 into small paragraph units on the basis of a section structure.

One of the fulltext documents D210 may include DOCID, TITLE, DOCTYPE, and DESCRIPTION. Here, DOCID may be a unique ID of a document. Also, DOCID may have a unique value from the set of entire fulltext documents D210. A page title may be recorded in the case of the first section in the TITLE. Section titles may be recorded hierarchically on the basis of section structures such as page title, upper section title, and current section title in the rest of sections. PAGE_CONTENT may be recorded in DOCTYPE and contents of the corresponding sections may be recorded in DESCRIPTION.

The document indexing part A200 may generate the fulltext document index D310 by analyzing languages for TITLE and DESCRIPTION of the fulltext document D210 and then extracting POS-based index terms. The first document D311 in FIG. 3 is a result generated from the first section of Eiffel Tower page to the Wikipedia document for questions and answers D200. The second document D312 in FIG. 3 is a result generated from the design material section of the Eiffel Tower page to the Wikipedia document for questions and answers D200.

FIG. 4 illustrates a section title document according to an embodiment of the present invention.

Referring to FIG. 4, the document converting part A100 may generate the section title document D220 recording only a page title and a section title by dividing one of the Wikipedia original documents D100 into small paragraph units. The one section title document D220 may include DOCID, TITLE, DOCTYPE, SECTION_CONTENT_DOCID and DESCRIPTION.

A page title may be recorded in case of the first section of a page in the TITLE and section titles may be recorded hierarchically on the basis of section structures such as page title, upper section title, and current section title in the rest of sections.

SECTION_TITLE may be recorded in the DOCTYPE. SECTION_CONTENT_DOCID may record ID of the fulltext document D210 to store contents of the section title document D220. DESCRIPTION may record page title, upper section title list, current section title and the like. The document indexing part A200 may generate the section title document index D320 by analyzing languages for the DESCRIPTION of the section title document D220 and then extracting POS-based index terms.

FIG. 4 illustrates document D321 which is an example of the section title document D220 corresponding to the design material section of the tower in the Wikipedia Eiffel Tower document. The fulltext document D312 in FIG. 3 is the fulltext document D210 corresponding to the section title document D321 in FIG. 4.

FIG. 5 illustrates an info-box document according to an embodiment of the present invention.

Referring to FIG. 5, the document converting part A100 may generate the info-box document D230 recording only contents of info-box by extracting info-box from one Wikipedia original document D100.

The info-box stores a list having summarized information of the corresponding page, wherein the information may include property ID and property value. One info-box document may include DOCID, TITLE, DOCTYPE, and DESCRIPTION. DOCID is a unique ID of a document and has a unique value in the set of the entire info-box document D230. A page title may be recorded in TITLE. Info-box may be recorded in the DOCTYPE. A list of page title, property ID and property value may be stored in the DESCRIPTION. Since property IDs having identical meanings can be used in different names in different documents, it can be standardized in one name. For example, since an property ID "Nation" of "President information" and an property ID "Nationality" of "Politician information" have the same meanings, they can be standardized to "Nation". The document indexing part A200 may generate the info-box document index D330 by analyzing languages for the DESCRIPTION of the info-box document D230 and then extracting POS-based index terms. FIG. 5 illustrates an info-box document generated by extracting an info-box document from the Wikipedia "Eiffel Tower" document.

FIG. 6 illustrates a category document according to an embodiment of the present invention.

Referring to FIG. 6, the document converting part A100 may generate the category document D240 recorded with only a page title and category contents by extracting category information from one of the Wikipedia original document D100. A category name represents general information of a corresponding page. One category document D240 may include DOCID, TITLE, DOCTYPE, and DESCRIPTION. DOCID is a unique ID of a document and has a unique value in the set of the entire category document D240. A page title may be recorded in TITLE. A CATEGORY may be recorded in DOCTYPE. DESCRIPTION stores a list of a page title and category name 1 to category name n in a single line. The document indexing part A200 may generate the category document index D340 by analyzing languages for the DESCRIPTION of the category document D240 and then extracting POS-based index terms. FIG. 6 illustrates a category document D341 generated by extracting category structure from the Wikipedia Eiffel Tower document.

FIG. 7 illustrates a definition statement document according to an embodiment of the present invention.

Referring to FIG. 7, the document converting part A100 may generate the definition statement document D250 recorded with only a page title and definition statements by extracting definition statements from one of the Wikipedia original document D100. The Wikipedia original document D100 may include explanation defining the title of the document corresponding to the first section. One definition statement document D250 may include DOCID, TITLE, DOCTYPE, and DESCRIPTION. DOCID is a unique ID of a document and has a unique value in the set of the entire definition statement document D250. A page title may be recorded in TITLE. DEFINITION may be recorded in DOCTYPE. the first section of the fulltext document D210 may be extracted and stored in DESCRIPTION. The document indexing part A200 may generate the definition statement document index D350 by analyzing languages for the TITLE of the TITLE and then extracting POS-based index terms. FIG. 7 illustrates a definition statement document D351 generated by extracting the first section from the Wikipedia Eiffel Tower original document.

Figure 8:
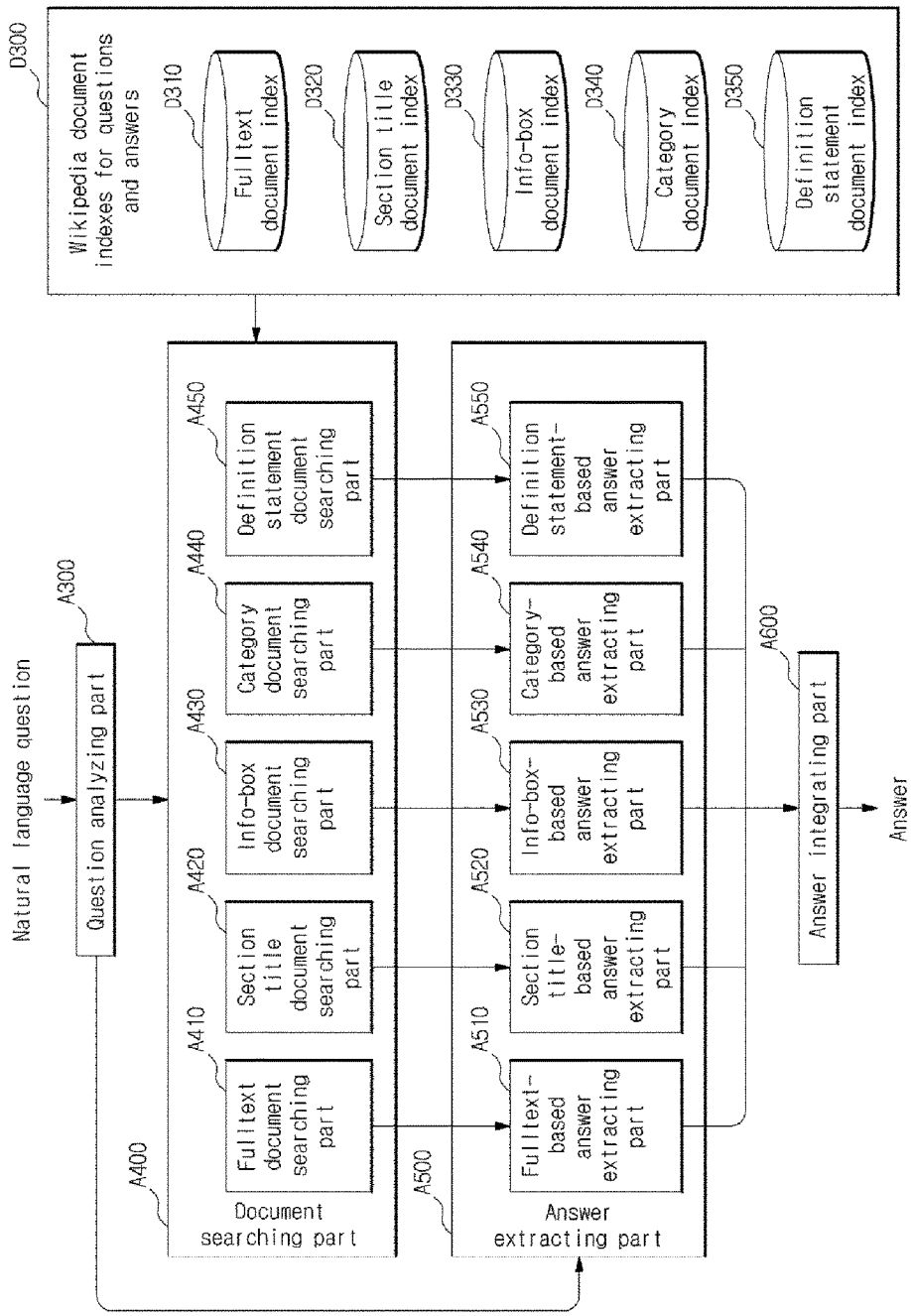
FIG. 8 illustrates an internal configuration of a question analyzing part, a document searching part and an answer extracting part according to an embodiment of the present invention.

FIG. 8 illustrates an internal configuration of a question analyzing part, a document searching part and an answer extracting part according to an embodiment of the present invention.

Referring to FIG. 8, the question analyzing part A300 may receive a natural language question from a user. The question analyzing part A300 may analyze question pattern, answer pattern and question focus from the natural language question and extract a document search keyword. In an embodiment of the present invention, the question pattern may include one chosen from a short-answer type question, a display type question and a descriptive type question but a type thereof is not particularly limited. The answer pattern may be one chosen from various answers such as people, organization and location, event name, TV program name, book name, policy name and the like according to application systems and the question focus may be one chosen from an entity of interest, an entity property and an entity ID.

The document searching part A400 may perform document search using document search keywords from the Wikipedia document index for questions and answers D300 and generate document search result from each Wikipedia document index for questions and answers D300.

The question analyzing part A300 according to an embodiment of the present invention may include a fulltext document searching part A410, a section title document searching part A420, an info-box document searching part A430, a category document searching part A440 and a definition statement document searching part A450.

The fulltext document searching part A410 may generate document search result by performing search at the fulltext document index D310 using document search keywords. The section title document searching part A420 may generate document search result by performing search at the section title document index D320 using document search keywords. The info-box document searching part A430 may generate document search result by performing search at the info-box document index D330 using document search keywords. The category document searching part A440 may generate document search result by performing search at the category document index D340 using document search keywords.

The definition statement document searching part A450 may generate document search result by performing search at the definition statement document index D350 using document search keywords.

The answer extracting part A500 may extract a first answer using information about the question pattern, the answer pattern and the question focus from the document search results.

The answer extracting part A500 may include a fulltext-based answer extracting part A510, a section title-based answer extracting part A520, an info-box-based answer extracting part A530, a category-based answer extracting part A540 and a definition statement-based answer extracting part A550.

The fulltext-based answer extracting part A510 may receive the document search result from the fulltext document searching part 또 and extract a first answer from the document searched on the basis of the answer pattern and the question focus.

The section title-based answer extracting part A520 may receive the document search result from the section title document searching part A420, wherein the document search result includes a section contents document, and provide the section contents document as a first answer.

The info-box-based answer extracting part A530 may receive the document search result from the info-box document searching part A430 and extract an property value as a first answer by matching the natural language question with entity or property ID of the info-box document.

The category-based answer extracting part A540 may receive the document search result from the category document searching part A440 and extract a title of a corresponding page as a first answer by matching the natural language question with a category list to which the page belongs.

The definition statement-based answer extracting part A550 may receive the document search result from the definition statement document searching part A450 and provide definition statement of the Wikipedia page as a first answer by matching the question focus with the Wikipedia page title.

The answer integrating part A600 may generate a second answer by integrating and prioritizing the first answers. In an embodiment of the present invention, the answer integrating part A600 may generate the second answer by receiving a plurality of the first answers from the answer extracting part A500, integrating the same answers from the plurality of the first answers, and providing the priority to the same answers. Here, the second answer may be provided as the final answer.

<Example 1> Fulltext-Based Question and Answering

Fulltext-based question and answering provides an answer to a user's question by extracting it from the fulltext document D210 of Wikipedia. For example, for a question of "Where is the Eiffel Tower?", the question analyzing part A300 classifies the question as a short-answer type question and then extracts a search keyword "Eiffel Tower". The fulltext document searching part A410 searches the first document D311 of FIG. 3 from the fulltext document index D310 using the search keyword "Eiffel Tower" and the fulltext-based answer extracting part A510 provides "Champ de Mars in Paris" as an answer which corresponds to "region/geography entity" among several entities extracted from the document searched based on the answer pattern of "region/geography entity" information which is analyzed by the question analyzing part A300. In addition, for a question of "what is weight of Eiffel Tower?", the question analyzing part A300 classifies it as a short-answer type question and then extracts search keywords, "Eiffel Tower", "weight". The fulltext document searching part A410 searches the second document D312 of FIG. 3 from the fulltext document index D310 using the search keywords "Eiffel Tower", "weight" and the fulltext-based answer extracting part A510 provides "10,000 tons" as an answer which corresponds to a quantity entity among several entities extracted from the document searched based on the answer pattern of "quantity entity" information which is analyzed by the question analyzing part A300.

<Example 2> Section Title-Based Question and Answering

Section title-based question and answering provides contents of a corresponding section as an answer by matching a user's question with Wikipedia page titles and section titles. For example, for a question of "what are materials which made Eiffel Tower?", the question analyzing part A300 classifies the question as a short-answer type question and then extracts search keywords "Eiffel Tower", "material". The section title document searching part A420 the searches section title document (D321 of FIG. 4) at the section title document index D320 using the search keywords. The section title-based answer extracting part A520 provides DESCRIPTION of the section contents document (D312 of FIG. 3) as an answer which corresponds to the searched section title document. For a question of which an answer pattern can be difficult to be standardized, an answer can be provided by using word similarity between keywords and section titles of the question.

<Example 3> Info-Box-Based Question and Answering

Info-box-based question and answering provides an property value as an answer by matching a user's question with entity, property ID of the info-box document. For example, for a question of "who are the architect of Eiffel Tower?", the question analyzing part A300 analyzes an entity of interest with "Eiffel Tower and an property name with "architect", and provides search keywords "Eiffel Tower", "architect". The info-box document searching part A430 searches an Eiffel Tower document (D331 of FIG. 5) using the search keywords for the info-box index D330. The info-box answer extracting part A530 provides an answer by extracting the property value "Gustave Eiffel" which corresponds to the property name "architect" from the searched document. The info-box document is able to provide an exact answer, when a question is an entity-property ID type, by using standardized property ID-property value information from the Wikipedia.

<Example 4> Category Structure-Based Question and Answering

Category structure-based question and answering provides a page title as an answer by matching a user's question with a category list in the page. For example, for a question of "Which building is the symbol of France?", the question analyzing part A300 classifies as a display type question and extracts, search keywords "France, symbol, building". The category document searching part A440 provides a category document (D341 of FIG. 6) by searching the category document index D340. The category-based answer extracting part A540 extracts and provides the first entity "Eiffel Tower" as an answer from the fulltext of the searched document. Since several documents are connected to the same category, the category document is able to provide an answer for the display type question for which several entities having common features are provided.

<Example 5> Definition Statement-Based Question and Answering

Definition statement-based question and answering provides definition statement of a corresponding page as an answer by matching a user's question which is a definition statement type with question focus and Wikipedia page title. For example, for a question of "Please, tell about the Eiffel Tower", the question analyzing part A300 classifies the question as a 는 "definition statement type" question and analyzes question focus as "Eiffel Tower". The definition statement document searching part A450 searches definition statement document (D351 of FIG. 7) by matching title for the 는 definition statement document index D350. The definition statement answer extracting part A550 extracts DESCRIPTION from the searched document and provides it as an answer. The definition statement type document is able to provide an answer without extracting additional definition statement from the fulltext for the definition statement type question.

<Example 6> Answer Integration

The answer integrator A600 integrates and prioritizes the same answers from the answers extracted by answer extracting part. For example, for a question of "Tell about the architect of Eiffel Tower", when "Eiffel" and "Gustave Eiffel" are provided as an answer, those two answers are considered as the same answer and then "Gustave Eiffel" which is more particular is provided as an answer and its weight is increased. In prioritizing answers, the priority of each answer extracting module is determined by question types and weight of the answer extracted from the module having higher priority is increased. For example, an "entity-property" type question such as "Tell about the architect of Eiffel Tower" makes the priority of the info-box-based answer extracting part A530 higher than those of other modules.

Figure 9:
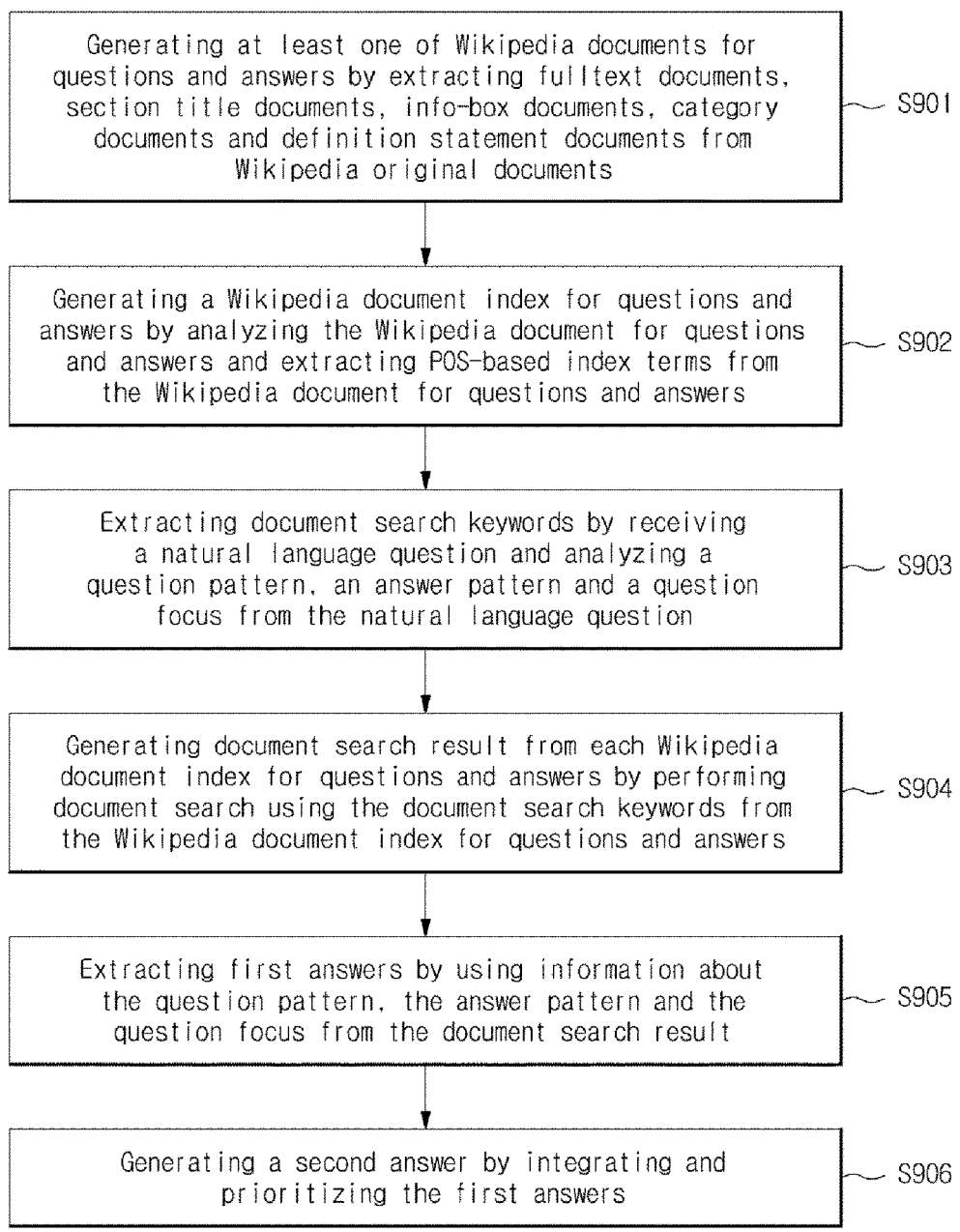
FIG. 9 is flowchart illustrating a method for searching information based on Wikipedia's contents according to an embodiment of the present invention.

FIG. 9 is a flowchart illustrating a method for searching information based on Wikipedia's contents according to an embodiment of the present invention.

Referring to FIG. 9, in S901, at least one of Wikipedia documents for questions and answers D200 may be generated by extracting a fulltext document D210, a section title document D220, an info-box document D230, a category document D240 and a definition statement document D25000 from the Wikipedia original document D100.

In S902, Wikipedia document index for questions and answers D300 may be generated by analyzing the Wikipedia document for questions and answers D200 and extracting POS-based index terms. Here, the Wikipedia document index for questions and answers D300 may include at least one chosen from a fulltext document index D310, a section title document index D320, an info-box document index D330, a category document index D340 and a definition statement document index D350.

In S903, document search keywords may be extracted by receiving a natural language question and analyzing a question pattern, an answer pattern and a question focus of the natural language question. Here, the question pattern may be one chosen from a short-answer type question, a display type question and a descriptive type question, the answer pattern may be one chosen from various answers such as people, organization, place, event name, TV program name, book name, policy name and the like according to application systems, and the question focus may be one chosen from an entity of interest, an entity property and an entity ID.

In S904, document search may be performed using the document search keywords at the Wikipedia document index for questions and answers D300 and document search result of each Wikipedia document index for questions and answers D300 may be generated.

In S905, a first answer may be extracted from the document search results using information about the question pattern, the answer pattern and the question focus.

In S906, the first answers are integrated and prioritized to generate a second answer. In the step of generating a second answer, the second answer may be generated by receiving a plurality of the first answers, integrating the same answers from the plurality of the first answers, and providing the priority to the same answers.

Methods or steps of algorisms described in conjunction with the above-mentioned exemplary embodiments can be implemented by hardware, a software module executed by a processor, or a combination thereof. The software module may be stored in a RAM memory, a flash memory, a ROM memory, an EPROM memory, an EEPROM memory, a register, a hard disk, detachable disk, a CD-ROM, or any storing medium well known to those who are skilled in the art. The storing medium may be connected with the processor and thus, the processor can read information from the storing medium and use the information to the storing medium. Alternatively, the storing medium can be integrated to the processor. The processor and the storing medium may be included in ASIC, which may be located within a user terminal. Alternatively, the processor and the storing medium may be included as additional components within a user terminal.

The above-mentioned processors may be implemented in one or more general-purpose or special purpose computers or software code modules executed by the processors, and be fully automated through the software code modules. The code modules may be stored in any type of computer readable media or other computer storing devices or the set of storing devices. Some or all of the methods may be implemented in specialized computer hardware.

The above-mentioned methods and tasks may be executed by a computer system and fully automated. The computer system may communicate through network to conduct the above-mentioned functions and include multiple individual computers which are interoperating and computing devices such as physical servers, workstations, storing arrays and the like. Each computing device generally includes program instructions stored in a memory or a non-transitory computer-readable storing medium or processors executing modules (or multi-processors or circuit or set of circuits such as modules). Some or all of the above-mentioned various functions may be implemented with application-specific circuits such as ASICs or FPGAs of a computer system. But the above-mentioned various functions may be implemented with such program instructions. When the computer system includes several computing devices, the devices may be positioned at the same place but it is not necessary. The above-mentioned methods and the results of the tasks may be stored permanently in different states by translating physical storing devices such as solid state memory chips and/or magnetic disks.

While the present invention has been described with reference to particular embodiments, it is to be appreciated that various changes and modifications may be made by those skilled in the art without departing from the spirit and scope of the present invention, as defined by the appended claims and their equivalents.

DESCRIPTION OF REFERENCE NUMERALS

A100: document converting part
A200: document indexing part
A300: question analyzing part
A310: fulltext document index
A320: section title document index
A330: info-box document index
A340: category document index
A350: definition statement document index
A400: document searching part
A410: fulltext document searching part
A420: section title searching part
A430: info-box searching part
A440: category searching part
A450: definition statement document searching part
A500: answer extracting part
A510: fulltext-based answer extracting part
A520: section title-based answer extracting part
A530: info-box-based answer extracting part
A540: category-based answer extracting part A550: definition statement-based answer extracting part
A600: answer integrator
D100: Wikipedia original document
D200: Wikipedia document for questions and answers
D300: Wikipedia document index for questions and answers

What is claimed is:

1. An apparatus for searching information based on a digital reference document containing both unstructured and structured information, comprising:
   a processor; and
   a non-transitory medium containing instructions, execution of which causes the apparatus to provide:
   a document converting part configured to perform a plurality of processings, respectively for generating a plurality of types of documents including a fulltext document, a section title document, an info-box document, a category document and a definition statement document, on the digital reference document, to thereby dissect the structured information of the digital reference document, each type of documents including
   a first field in which a unique identification of said each type of document is recorded,
   a second field in which a title of a page or of a hierarchical section of the digital reference document is recorded,
   a third field in which said each type is recorded, and a fourth field in which contents of said each type of documents are recorded;
   a document indexing part analyzing the fourth field of the generated documents, extracting a plurality of part-of-speech (POS)-based index terms from the fourth field of each generated document, and generating a plurality of document indices for questions and answers that are respectively a fulltext document index, a section title document index, an info-box document index, a category document index and a definition statement document index;
   a question analyzing part receiving a natural language question, analyzing a question pattern, an answer pattern and a question focus from the natural language question, and extracting document search keywords from the natural language question;
   a document searching part performing a document search, using the document search keywords, on each of the document indices for questions and answers, and generating a document search result from said each of the document indices for questions and answers;
   an answer extracting part extracting an intermediate answer using information about the question pattern, the answer pattern and the question focus from each of the document search result; and
   an answer integrating part integrating and prioritizing the intermediate answers, by assigning different weights to similar intermediate answers in accordance with specificity of each of the similar intermediate answers, wherein the more detailed similar intermediate answer receives a higher weight than a less detailed one, and correlation between a type of each natural language question and each of the plurality of types of documents,
   to thereby generate a final answer using both the unstructured and structured information in the digital reference document.

2. The apparatus of claim 1, wherein the question pattern is one selected from the group consisting of a short-answer type question, a display type question and a descriptive type question.

3. The apparatus of claim 1, wherein the answer pattern includes a pattern of answers for people, a pattern of answers for organization and a pattern of answers for location.

4. The apparatus of claim 1, wherein the question focus is one selected from the group consisting of an entity of interest, an entity property and an entity ID.

5. The apparatus of claim 1, wherein the document searching part comprises:
   a fulltext document searching part generating the document search result by performing a fulltext document index search from said each document index for questions and answers using the document search keywords;
   a section title document searching part generating the document search result by performing a section title document index search from said each document index for questions and answers using the document search keywords;
   an info-box document searching part generating the document search result by performing an info-box document index search from said each document index for questions and answers using the document search keywords;
   a category document searching part generating the document search result by performing a category document index search from said each document index for questions and answers using the document search keywords; and
   a definition statement document searching part generating the document search result by performing a definition statement document index search from said each document index for questions and answers using the document search keywords.

6. The apparatus of claim 5, wherein the answer extracting part comprises:
   a fulltext-based answer extracting part receiving said each document search result from the fulltext document searching part of the document searching part and extracting the intermediate answer based on the answer pattern and the question focus;
   a section title-based answer extracting part receiving said each document search result from the section title document searching part of the document searching part, extracting a section contents document from said each document search result, and providing the section contents document as the intermediate answer;
   an info-box-based answer extracting part receiving said each document search result from the info-box document searching part of the document searching part and extracting an property value as the intermediate answer;
   a category-based answer extracting part receiving said each document search result from the category document searching part of the document searching part and extracting a title of a corresponding page as the intermediate answer by matching the natural language question with a category list to which the page belongs; and
   a definition statement-based answer extracting part receiving said each document search result from the definition statement document searching part of the document searching part and providing a definition statement of the digital reference document as the intermediate answer.

7. The apparatus of claim 1, wherein the document converting part is configured to divide the digital reference document based on a section structure of the digital reference document, to thereby generate a plurality of the fulltext documents.

8. A method for searching information based on a digital reference document containing both unstructured and structured information, comprising:

performing a plurality of processings, respectively for generating a plurality of types of documents including a fulltext document, a section title document, an info-box document, a category document and a definition statement document, on the digital reference document, to thereby dissect the structured information of the digital reference document, each type of documents including a first field in which a unique identification of said each type of document is recorded, a second field in which a title of a page or of a hierarchical section of the digital reference document is recorded, a third field in which said each type is recorded, and a fourth field in which contents of said each type of documents are recorded;

analyzing the fourth field of the generated documents, extracting a plurality of part-of-speech (POS)-based index terms from the fourth field of each generated document, to thereby generate a plurality of document indices for questions and answers that are respectively a fulltext document index, a section title document index, an info-box document index, a category document index and a definition statement document index;

extracting document search keywords by receiving a natural language question and analyzing a question pattern, an answer pattern and a question focus from the natural language question;

generating a document search result from each of the document indices for questions and answers by performing a document search using the document search keywords on said each of the document indices for questions and answers;

extracting an intermediate answer using information about the question pattern, the answer pattern and the question focus from said each of the document search result; and generating a final answer using both the unstructured and structured information in the digital reference document, by integrating and prioritizing the intermediate answers, including assigning different weights to similar intermediate answers in accordance with specificity of each of the similar intermediate answers, wherein the more detailed similar intermediate answer receiving receives a higher weight than a less detailed one, and correlation between a type of each natural language question and each of the plurality of types of documents.

9. The method of claim 8, wherein the question pattern is one selected from the group consisting of a short-answer type question, a display type question and a descriptive type question, wherein the answer pattern includes a pattern of answers for people, a pattern of answers for organization and a pattern of answers for location, and wherein the question focus is one selected from the group consisting of an entity of interest, an entity property and an entity ID.

10. The method of claim 8, wherein the step of generating the document search result from said each document index for questions and answers comprises:

generating the document search result by performing a fulltext document index search from said each document index for questions and answers using the document search keywords;

generating the document search result by performing a section title document index search from said each document index for questions and answers using the document search keywords;

generating the document search result by performing an info-box document index search from said each document index for questions and answers using the document search keywords;

generating the document search result by performing a category document index search from said each document index for questions and answers using the document search keywords; and generating the document search result by performing a definition statement document index search from said each document index for questions and answers using the document search keywords.

11. The method of claim 8, wherein the step of extracting the intermediate answer comprises:

receiving said each document search result from the fulltext document searching part of the document searching part and extracting the intermediate answer based on the answer pattern and the question focus;

receiving said each document search result from the section title document searching part of the document searching part, extracting a section contents document from said each document search result, and providing the section contents document as the intermediate answer;

receiving said each document search result from the info-box document searching part of the document searching part and extracting an property value as the intermediate answer;

receiving said each document search result from the category document searching part of the document searching part and extracting a title of a corresponding page as the intermediate answer by matching the natural language question with a category list to which the page belongs; and receiving said each document search result from the definition statement document searching part of the document searching part and providing a definition statement of the digital reference document page as the intermediate answer.

12. The method of claim 8, wherein said performing a plurality of processings includes dividing the digital reference document based on a section structure of the digital reference document, to thereby generate a plurality of the fulltext documents.

* * * * *